United States Patent Office 3,419,657
Patented Dec. 31, 1968

3,419,657
IODOPANOIC ACID IN A HYDROGEL
Johannes C. Sanders, Laren, Netherlands, assignor to Dagra N.V., Diemen, Netherlands, a limited-liability company of the Netherlands
No Drawing. Filed June 23, 1964, Ser. No. 377,373
3 Claims. (Cl. 424—5)

ABSTRACT OF THE DISCLOSURE

The unpleasant taste of iodine-bearing radiopaque materials used for cholecystography is masked, and the resorption of the materials is improved by dispersing the same in a finely divided form in a hydrogel which is made more palatable by addition of sugar and flavoring agents. The method is applicable to iodopanoic acid, its salts, phenoiodol, and iodoethionic acid.

---

This invention relates to medicinal compositions and to a method of preparing the same.

More specifically, the invention is concerned with a palatable medicinal composition containing iodopanoic acid as the active ingredient. Iodopanoic acid is a very effective radiopaque medium for cholecystography, when applied orally in proper dosage and in the proper form. It has a very unpleasant taste and is not readily acceptable to a patient when offered in the form of an aqueous solution.

When the acid is tableted, the taste is less unpleasant because very little of the substance can dissolve from the relatively small available surface of the tablet, but the tablet does not disintegrate adequately in the intestinal tract, and an unresorbed residue in the intestine may interfere with observation of the gall bladder.

An attempt has been made to avoid the formation of radiopaque masses of iodopanoic acid in the intestine by administering the contrast agent in the form of its readily soluble sodium salt. When a solution of the salt is acidified by contact with gastric acid, the free iodopanoic acid is precipitated in the form of small amorphous particles having a very favorable surface-to-weight ratio and capable of being absorbed through the intestinal wall without leaving a residue.

However, the sodium salt, because of its high solubility, tastes even worse than the free acid. If it is provided with a sugar coating, as in a dragee, precipitation of the free acid in the stomach is delayed, and the salt may leave the stomach without being decomposed. Solubility in the alkaline contents of the intestine is not sufficient to prevent the formation of radiopaque masses there.

The normal dosage of iodopanoic acid for cholecystography is three grams. The corresponding amount of even a concentrated solution of the sodium salt is so great than it cannot conveniently be accommodated in one gelatin capsule or even a few gelatin capsules of manageable size. Although gelatin capsules would provide the rapid release of the sodium iodopanoate in the stomach necessary for precipitation of the free acid, inadvertent biting of such a capsule by a patient can have the most unpleasant effects.

The object of the invention is the release of iodopanoic acid in the intestinal tract in the small particles characteristic of the reaction of the sodium salt with gastric acid while avoiding the difficulties inherent in the ingestion of sodium iodopanoate.

A more specific object is the provision of a medicinal composition which contains iodopanoic acid in finely divided form, yet to avoid the unpleasant taste of the active agent.

It has been found that the taste of iodopanoic acid is greatly improved and that its resorption from the intestinal tract is facilitated when the finely divided radiopaque material is dispersed in a carrier which essentially consists of a hydrogel of an edible binder and sugar to which flavoring and coloring materials may be added. Suitable binders are those which are commonly employed in fruit jellies and fruit candies. They include gelatin and other proteinaceous and protein-like materials, the substances generally referred to as gums, such as gum arabic and gum tragacanth, and such carbohydrates as agar-agar and starch. The binder is present in the carrier compositions of the invention in a typical amount of 0.20%. The remainder consists of sugars, such as sucrose or glucose, in an amount of 50 to 95%, of a humectant, such as glycerol or sorbitol, in an amount of 0 to 15%, of an organic acid, such as tartaric or citric acid, in an amount of 0 to 5%. The composition may further include a filler, such as fruit pulp or similar chemically inert and basically tasteless material, in an amount of 0 to 50%, and 0 to 15% water. Flavoring and coloring agents and preservatives may additionally be present.

If the iodopanoic acid compositions of the invention are intended for use in the tropics, a small amount of silicon dioxide or of calcium silicate, say 0.5 to 2.5%, may be included in the carrier.

Before the iodopanoic acid is admixed to the carrier, it is finely ground on a ball mill or a rod mill to particle size of 10 to 50 microns, and it is then uniformly dispersed in the carrier. If so desired, a portion of the carrier may be admixed to the active material prior to ultimate comminution of the latter, and the mixture may then be processed until the individual particles of iodopanoic acid are reduced to the desired size and are individually coated with the carrier material.

The following example is further illustrative of the method of the invention but it will be understood that the invention is not limited thereto:

500 grams agar-agar were dissolved in 15 liters water. The solution was filtered to remove a small amount of insoluble material, and 20 kilograms sugar and one kilogram 70% sorbitol were added to the filtrate. The filtrate was evaporated until a sample formed a shape retaining hydrogel upon cooling. 12.5 kilograms 40% glucose syrup were then added to the boiling hot material, and the mixture was cooled to 60° C.

A liquid preparation of synthetic raspberry color was prepared by dissolving 600 grams amaranth and 2.0 kg. glucose syrup in six liters of boiling water and by filtering off undissolved matter. A three-liter portion of this raspberry color, 2.0 kg. raspberry pulp, 500 grams raspberry essence, and 250 grams powdered citric acid were added to the cooled mixture of agar-agar, water, sucrose and sorbitol to complete the carrier mixture.

4.50 kilograms $\alpha$-ethyl-$\beta$-3-amino-2,4,6-triiodophenyl-propionic acid (iodopanoic acid) were ground to a particle size of 10 to 50 microns and uniformly dispersed in the hot and fluid carrier mixture. The composition was then cast in molds of a size sufficient to contain an amount of the mixture including 750 mg. of the radiopaque material each. Upon further cooling, the contents of each mold gelled to a shape retaining body which was then unmolded, dried in flour and covered with granulated sugar. After drying of the surface, each body of gelled material was immersed in a 70% sucrose solution, and again permitted to dry.

The product obtained had the familiar appearance and taste of raspberry fruit candy with very little of the unpleasant iodopanoic acid taste being noticeable. Four pieces of the gelled product provided the necessary adult dose of 3 grams iodopanoic acid and are readily acceptable even to sensitive patients.

Iodopanoic acid may be replaced by equivalent amounts of its salts with physiologically tolerated bases in the procedure outlined above. In all cases, the rapid dissolution of the mixture of sugar and hydrogel in the stomach sets free iodopanoic acid in finely divided readily resorbed form.

While the invention has been described with specific reference to iodopanoic acid and its salts, it will be appreciated that other therapeutic or diagnostic medicinal agents of unpleasant taste which are not readily resorbed from the intestinal tract may be dispersed in the carrier of the invention, and may thus be made acceptable to a patient without compromising their effectiveness.

All iodine-containing organic compounds which are suitable as radiopaque media in cholecystography have a more or less unpleasant taste which can be avoided by incorporating these active agents in the carrier of the invention in the same manner as described hereinabove with reference to iodopanoic acid and its salts. Typical of such other radiopaque compounds are phenoiodol, which is 2-phenyl-3-(3,5-diiodo-4-hydroxyphenyl)propionic acid, and iodo-ethionic acid, which is 2-ethyl-3-(2,4,6-triiodo-3-hydroxyphenyl)propionic acid.

It is, therefore, to be understood that the invention is not limited to the specific embodiment chosen for the purpose of illustration but is to be construed broadly and restricted solely by the scope of the appended claims.

What is claimed is:
1. A radiopaque composition consisting essentially of:
   (a) an effective amount of finely comminuted iodopanoic acid; and
   (b) a shape-retaining edible hydrogel as a carrier for said iodopanoic acid,
   (1) said iodopanoic acid being uniformly dispersed in said hydrogel,
   (2) the hydrogel containing an amount of a sugar sufficient substantially to improve the taste of said hydrogel having said iodopanoic acid dispersed therein.
2. A composition as set forth in claim 1 wherein said iodopanoic acid is dispersed in said hydrogel in the form of particles having a size of ten to fifty microns.
3. A composition as set forth in claim 1, wherein the hydrogel consists essentially of approximately 0.20% of gelatin, gum arabic, gum tragacanth, agar-agar or starch, 50 to 95% of said sugar, the sugar being sucrose, or glucose, 0 to 15% of glycerol or sorbitol as a humectant, 0 to 5% of tartaric or citric acid, 0 to 50% of a chemically inert and substantially tasteless filler, and water.

References Cited

UNITED STATES PATENTS

| | | | |
|---|---|---|---|
| 1,858,142 | 5/1932 | Ellzey | 167—95 |
| 1,984,404 | 12/1934 | Ellzey | 167—95 |
| 2,208,120 | 7/1940 | Coleman | 167—82 |
| 2,307,189 | 1/1943 | Bell | 167—95 |
| 2,892,753 | 6/1959 | Schmidt | 167—82 X |
| 2,926,121 | 2/1960 | Hobbs et al. | 167—82 |
| 3,047,466 | 7/1962 | Priewe et al. | 167—95 |
| 3,051,745 | 8/1962 | Obendorf | 167—95 X |
| 3,079,303 | 2/1963 | Raff et al. | 167—82 |

OTHER REFERENCES 836,884   6/1960   Great Britain.

ALBERT T. MEYERS, *Primary Examiner.*

V. C. CLARKE, *Assistant Examiner.*